US005712458A

United States Patent [19]

McCandless et al.

[11] Patent Number: 5,712,458

[45] Date of Patent: Jan. 27, 1998

[54] DOOR SENSOR BEAM

[75] Inventors: Shan H. McCandless, Brampton, Canada; Stefan Walkowiak, St. James, N.Y.

[73] Assignee: The Peelle Company, Bay Shore, N.Y.

[21] Appl. No.: 513,154

[22] Filed: Aug. 9, 1995

[51] Int. Cl.[6] .......... B60B 13/26

[52] U.S. Cl. .......... 187/317; 49/25; 187/392; 187/413

[58] Field of Search .......... 187/316, 317, 187/314, 413, 392; 49/25, 26, 27

[56] References Cited

U.S. PATENT DOCUMENTS

| | | | |
|---|---|---|---|
| 1,864,093 | 6/1932 | Prince | 187/413 |
| 3,885,773 | 5/1975 | Dunkelberger | 254/190 R |
| 4,274,226 | 6/1981 | Evans | 49/25 |
| 4,953,608 | 9/1990 | Larsson | 160/1 |
| 4,984,658 | 1/1991 | Peelle, Jr. et al. | 187/58 |
| 5,394,961 | 3/1995 | Biver | 187/317 |

*Primary Examiner*—Robert Nappi
*Attorney, Agent, or Firm*—Pearne, Gordon, McCoy & Granger

[57] ABSTRACT

An assembly for a no-contact power reversing system for an elevator car gate comprises a lost-motion linkage comprising inner and outer telescoping members, the inner member having an upper extension which stabilizes and protects the electrical cable leading to the scanner unit of the device during retraction and extension of the scanner unit mounting as the gate approaches and leaves full closed position. The linkage and associated parts mounted in such a way that the scanner unit is protected against pilferage.

6 Claims, 4 Drawing Sheets

DOOR SENSOR BEAM

BACKGROUND OF THE INVENTION

This invention relates to elevator control and, more particularly, to improvements in apparatus for sensing an object in the path of an elevator car closure or gate.

PRIOR ART

It is known from U.S. Pat. No. 4,274,226, for example, to sense objects in the path of vertically sliding doors with a scanning beam of microwave radiation or the like set at a fixed distance below the lower edge of the gate. U.S. Pat. No. 4,984,658 further discloses the provision of a scanning beam that leads the gate in downward movement until the final stage of closing motion. The beam projecting and receiving elements, such as an infra-red projector/reflector and sensor, are mounted on and suspended below carriages carried on guide tracks associated with the car gate. The carriages travel with the gate as it closes until the gap of the gate from full close is less than the lead distance. As the gate completes its closing movement, the carriages retract relative to the car gate while the beam is maintained at the car threshold, whereby the scanning beam retracts. The carriages are carried on guide tracks which are fixed to the gate or closure. The beam projecting and receiving elements are connected to suitable power and control elements by a flexible electrical cable which is given enough free play to accommodate the relative movement between the car gate and the carriage-mounted elements, and which may be subject to chafing and scuffing by the relatively moving parts. The scanning beam projector and sensor are valuable control components, useful for various control applications, and are typically packaged within an appropriate scanner housing as a unit. These scanner units are vulnerable to pilferage, since a unit can be removed simply by clipping the cable leading to it and removing the mounting fasteners for the unit.

SUMMARY OF THE INVENTION

The invention provides an improvement in apparatus of the type disclosed in aforesaid U.S. Pat. No. 4,984,658. The invention provides more reliable retraction coupled with greater lead distance, less exposure to damage, and high resistance to pilferage, all at acceptably low cost. The combined reliability of retraction and relatively great lead length is achieved by use of a novel telescoping lost-motion linkage to effect the retracting and extending action of the system, and by providing the linkage with means to stabilize the electrical cable which leads to the scanner unit and isolate it from contact with elements moving relatively to it, so as to guide it and protect it against chafing and scuffing. The telescoping lost-motion linkage also protects the scanner unit against pilferage by making it virtually unremovable apart from bodily removal of the entire linkage system from the elevator car. Such removal is unwieldy in any case, and is further discouraged by arrangements preventing the removal of the mounting screws for the system by conventional screwdrivers or the like.

DESCRIPTION OF THE PREFERRED EMBODIMENT

Figure 2:
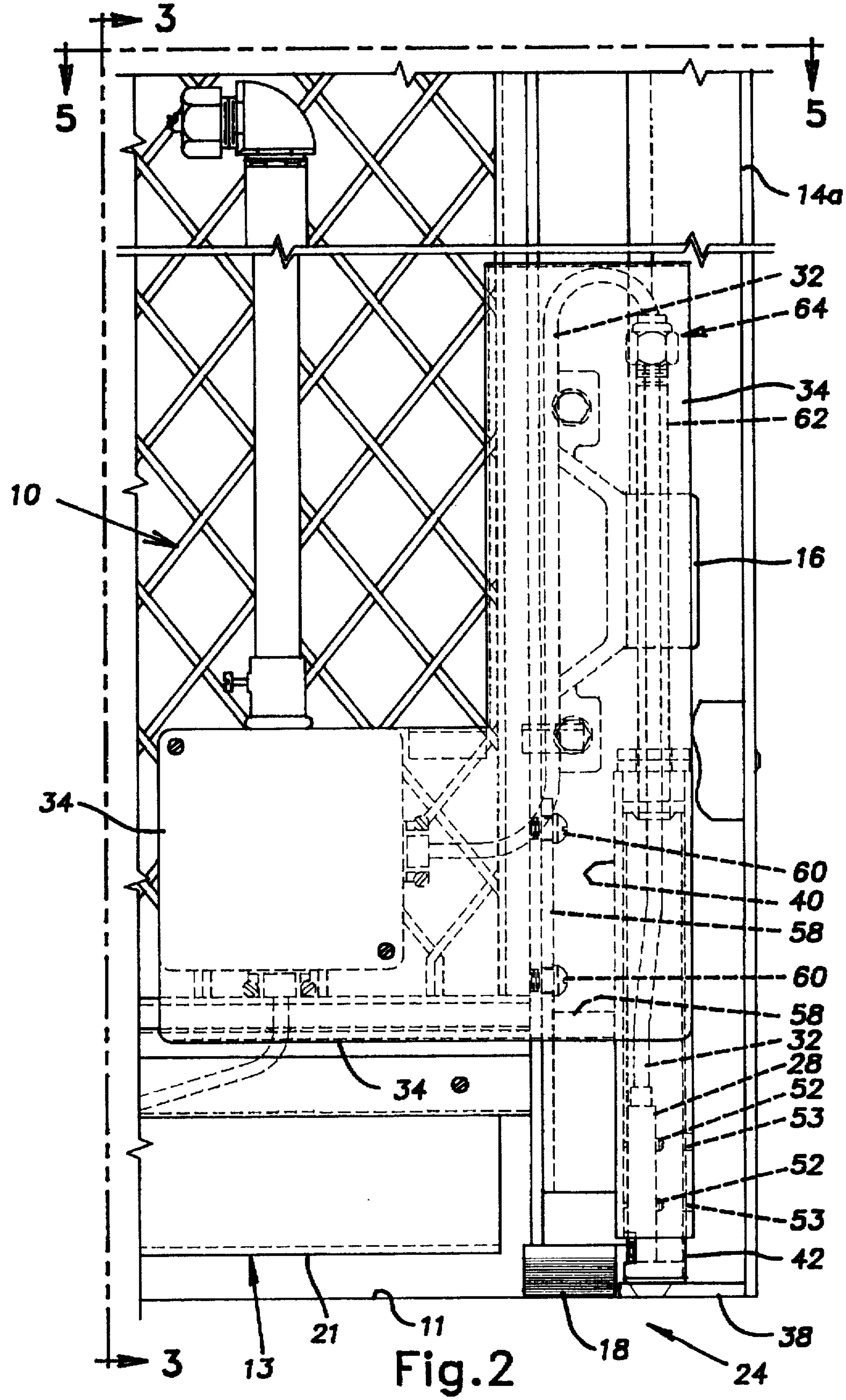
FIG. 2 is a fragmentary elevational front view showing bottom right portion of an elevator gate and parts (as viewed from the exterior side of the gate), and illustrating the same apparatus as is seen in FIG. 1.

Referring now to the drawings, there is partially illustrated an automatic power-operated closure or gate 10 for an elevator car. The car and gate arrangement in general may be similar to that of above-mentioned U.S. Pat. No 4,984,658, of common assignee, the disclosure of which is incorporated by reference as if fully repeated herein. The car is guided and powered in a known manner for vertical travel in a hoistway between landings at which an edge of the floor 11 of the car is aligned with the landing floor edge. The gate 10 includes a wire mesh as seen in FIG. 2, the mesh being carried by gate frame channel members such as the channel 15 and gate frame angle members such as the angle 17. The gate is mounted on the car for relative vertical sliding motion between an open position where it provides access and egress between the car and landing and a closed position where it restrains objects on the car from falling or engaging the walls of the hoistway. The car has vertical side rails on which the gate 10 is guided by guide shoes, one rail 14 and guide shoe 16 being visible in the drawings. Automatic opening and closing motion of the gate 10 on the car is powered by a reversible motor (not shown) in a known manner. The bottom or closing edge of the door may be defined across most of its width by a resilient astragal 13 which is carried on the gate frame. Bumpers supported on the gate frame, such as the bumper 18, may be provided at each end of the closing edge.

Means adjacent opposite ends of the closing edge of the gate 10 constitute means for establishing a scanning beam across and below the bottom edge of the gate. This beam may extend in one direction only, or may be projected from one end of the gate to a mirror or other energy reflector at the other end, and thence back to a sensor adjacent the point of beam projection. In any event, a scanner unit or housing 28 (FIGS. 2–4) is provided in association with at least one end of the gate 10. Such end is labelled 24 in the drawings (FIG. 2). The scanner unit includes projecting means or sensor means, or both as in the illustrated embodiment. A flexible electric cable 32 conducts power and signals between the scanner housing 28 and a remote controller for the elevator car. The cable leads from a junction box 33 (FIG. 1) fixed to the front of the gate 10. The scanner housing 28 contains cable terminal and connector means (not shown) for completion of circuit connections to one or more beam scanner elements such as the elements 26 and 27, one of which may comprise a beam projector and the other a beam-receiving sensor element.

A lost-motion linkage means for accommodating the retraction and extension of the scanning beam includes an outer telescoping member 40 and an inner telescoping member 42. The outer telescoping member is welded to a flanged mounting member or bracket 58 which in turn is anchored to gate frame angle member 17 by screws 60.

The inner telescoping member 42 carries and surrounds the sensor housing 28; however the scanner elements 26 and 27 are exposed through a cut-out 29 at the lower end of the inner telescoping member 42 as shown in the drawings. The housing 28 is fastened within the inner telescoping member by fasteners 52 accessible only from the direction of the flange 14*a* of the associated guide rail 14 through sidewall openings 53 (FIG. 2) formed in inner telescoping member 42. Thus, the fasteners 52 cannot be accessed and the housing 28 removed without bodily removing the entire lost motion linkage.

The lower end of the inner telescoping member 42 comprises a bumper end (bottom end) designed to engage a stop element, such as the stop plate 38, associated with the car floor. It is this engagement which forces the retraction of the inner telescoping member as the gate 10 approaches its closed position.

Figure 1:
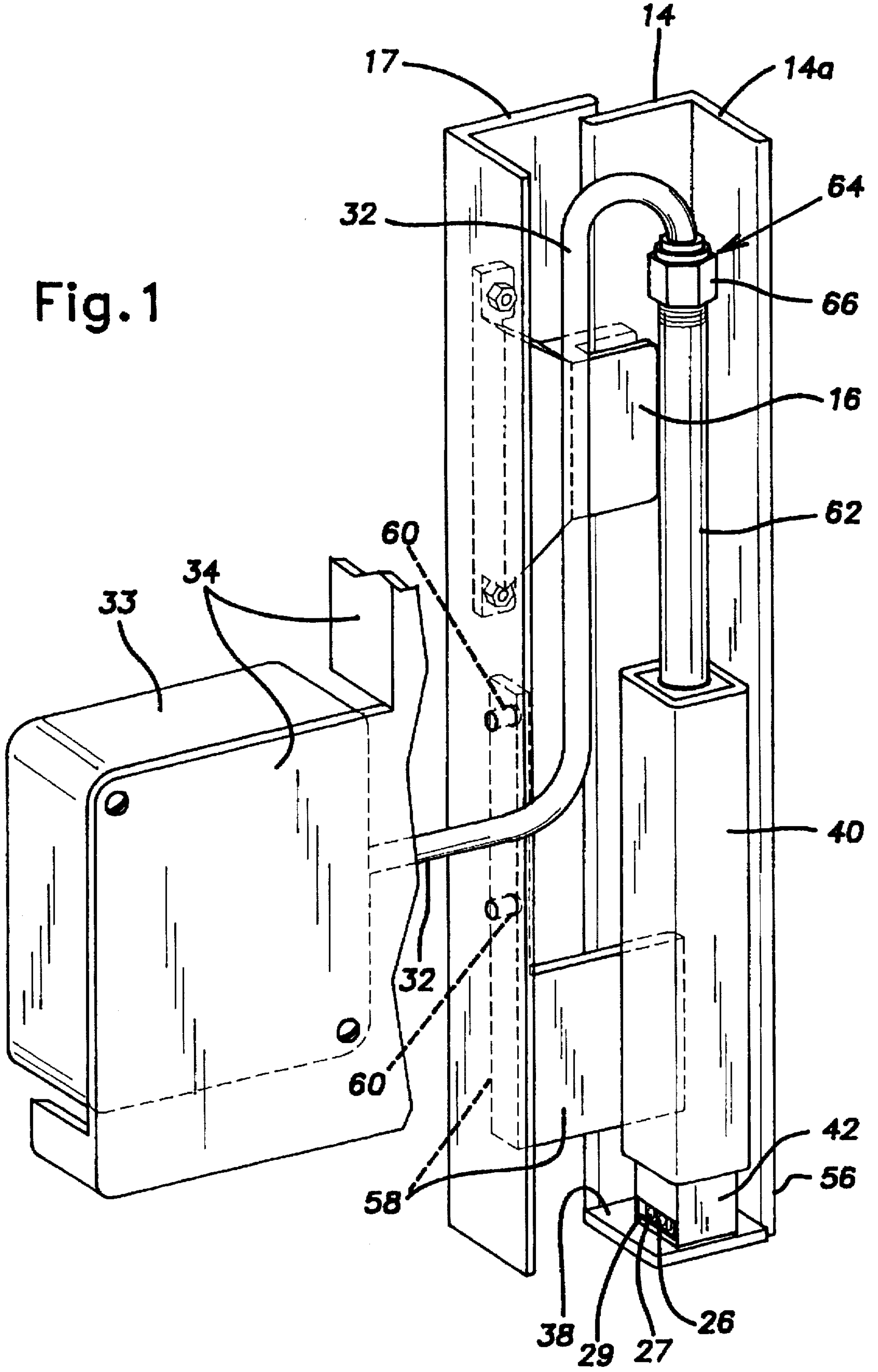
FIG. 1 is an isometric view, partly broken away, of apparatus embodying the invention.
Figure 3:
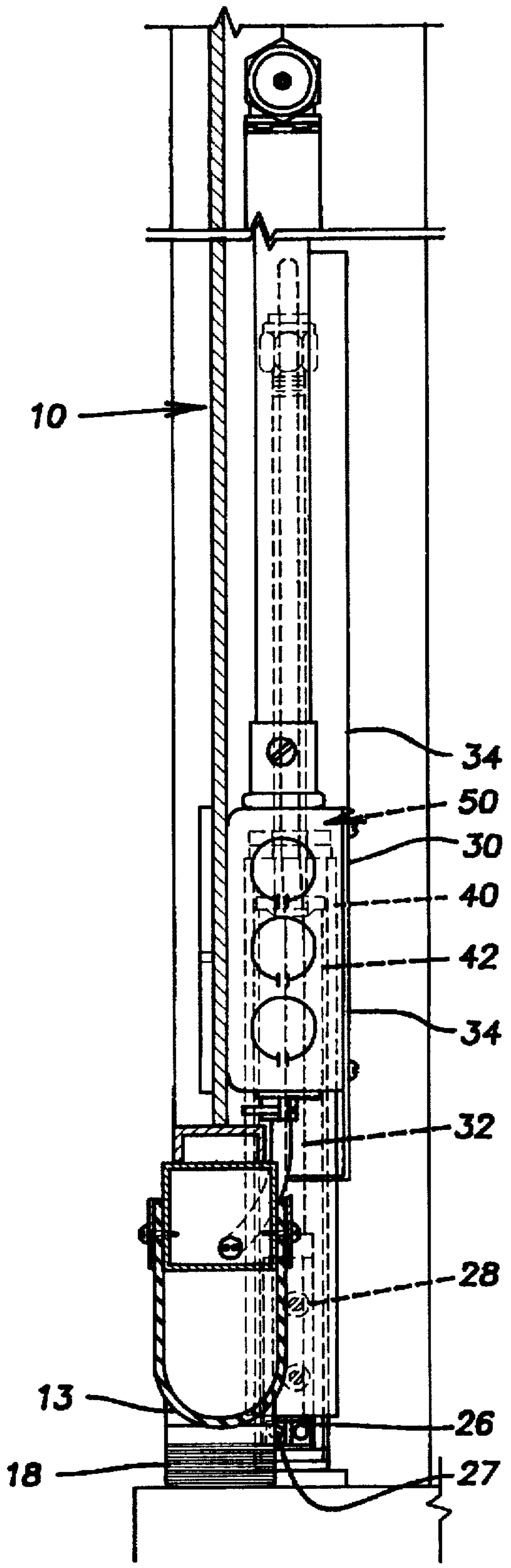
FIG. 3 is a fragmentary side elevational view taken on the plane of line 3—3 in FIG. 2.
Figure 4:
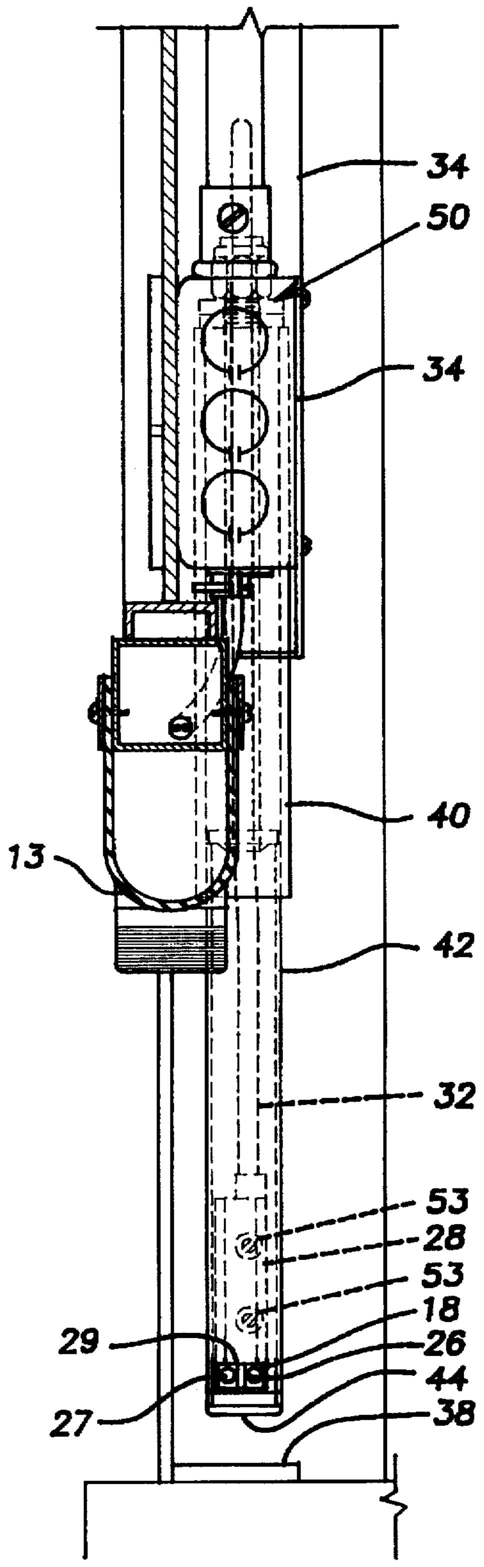
FIG. 4 is a view similar to FIG. 3 but showing the parts in a different position.

The inner telescoping member 42 has an upper extension 62 which extends lengthwise above the outer telescoping member 40 when the inner telescoping member is in retracted position relative to the closure or gate 10, as seen in FIGS. 1–3. The flexible cable 32 extends into the upper end 64 of the extension 62 and lengthwise within the extension and then down through the inner telescoping member proper 42 to the scanner housing 28. As the gate 10 rises from closed position and the inner telescoping member shifts to its hanging position, seen in FIG. 4, the upper extension 62, and the corresponding length portion of the cable 32 within the extension 62, both follow down into the outer telescoping member. During this movement, and during the reverse movement of these parts as the gate 10 moves to closed position, the cable 32 is stabilized and is isolated from contact with the outer telescoping member 40 and is guided and protected by the extension 62 against chafing and scuffing, and resultant wear.

The cable 32 may fit fairly snugly within the inner diameter of the extension 62, and the friction of the snug fit may be relied on to effectively fasten these elements together so that the cable will not slip within the extension 62. A nut 66 threaded on the top end of the extension 62 serves to limit the downward movement of the inner telescoping member relative to the outer telescoping member to thereby define the distance that the scanner hangs below the bottom edge of the gate when the scanning system is fully extended below the gate bottom edge, thereby in turn defining the distance by which the scanning beam leads the bottom of the car gate. The lead distance may be adjusted by adjusting the nut 66. The nut may be of a known self-locking type provided with an anti-rotation liner or similar means.

A flanged cover plate 34 at the front of the gate 10 covers the junction box 33, the portions of the cable 32 that would be otherwise exposed, and most of the assembly comprising the inner and outer telescoping members 42 and 40 and the bracket 58.

Figure 5:
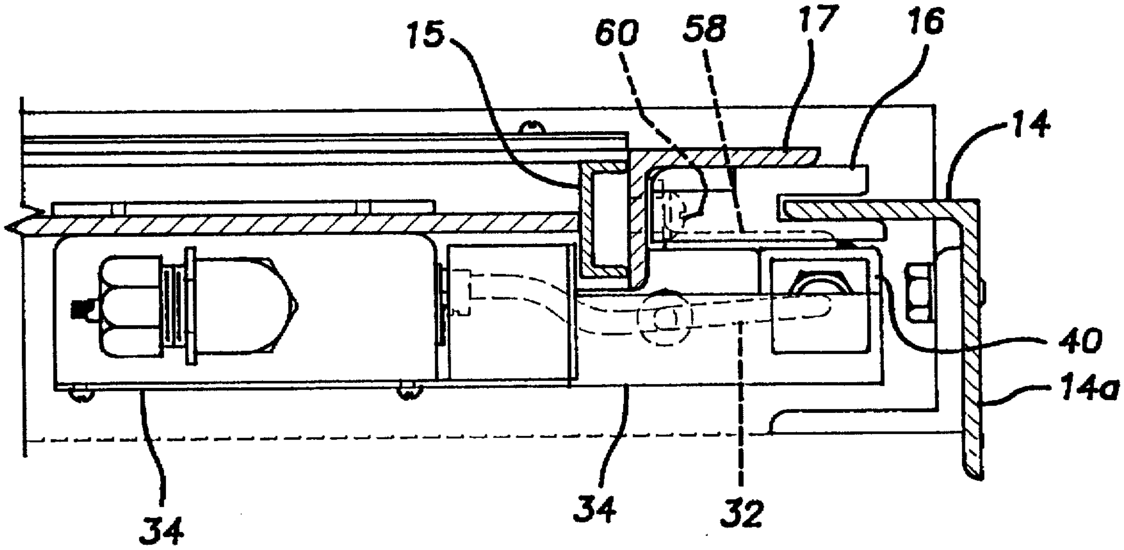
FIG. 5 is a fragmentary plan view taken on the plane of line 5—5 in FIG. 2.

It is to be noted that the screws 60, which anchor the bracket 58 to the gate frame angle 17, are not only within the angle of the gate frame angle member 17 but also face the associated guide rail 14 which is closely spaced therefrom, as best seen in FIG. 5. Pilferage is discouraged because even if a thief removes the cover plate 34 and cuts the cable 32 in order to remove the assembly comprising the inner and outer telescoping members 42 and 40 and the bracket 58, the assembly cannot be bodily removed from the car closure or gate by a conventional screwdriver or like tool, but rather requires a special offset screwdriver, and is an unwieldy operation. But, as mentioned above, only by such bodily removal can the fasteners 52 be accessed in order to remove the housing 28 along with its relatively valuable circuit and scanning components.

It should be evident that this disclosure is by way of example, and that various changes may be made by adding, modifying or eliminating details without departing from the fair scope of the teaching contained in this disclosure. For example, although the gate 10 is of the rigid type, it will be understood that the invention may be used with solid panel, sheet panel, perforated panel, expanded panel, roll-up type car gates (doors) and hoistway landing doors of other material forms as well. The invention therefore is not limited to particular details of this disclosure except to the extent that the following claims are necessarily so limited.

What is claimed is:

1. In an automatic power-operated gate for an elevator car having a car floor and vertical flanged side rails on which the gate is guided, said closure having means adjacent opposite ends of the closing edge of the gate for establishing a scanning beam parallel to and ahead of the closing edge of the gate at a predetermined distance sufficient to sense an interfering object in the path of the gate by interruption of the beam during closing motion of the gate and thereby provide a signal to cause the power operator of the gate to stop or reverse the motion of the gate before it strikes the interfering object, at least one end of said closing edge of said gate having, as its associated part of said beam-establishing means, at least one beam-establishing element proper comprising a beam projector or a beam receiver, and a scanner housing to carry and house said beam-establishing element proper together with cable terminal and connector means, an electrical cable leading from said car gate to said cable terminal and connector means, said at least one end of said gate also having associated with it lost-motion linkage means, one part of said linkage means being associated with said scanner housing, whereby as said closing edge approaches closed position, said one part of said linkage associated with said scanner housing may engage a stop associated with said car floor, and said one part and said scanner housing may cease movement in the closing direction and thereby, while said gate completes movement to closed position, retract from a hanging position relative to said gate to a fully retracted position relative to said gate, the improvement wherein said lost-motion. linkage means includes inner and outer telescoping members extending vertically adjacent the associated one of said vertical side rails on which the gate is guided, said outer telescoping member being mounted on and for movement with said gate, said inner telescoping member comprising said part of said linkage means associated with said scanner housing, said inner member telescoping within said outer member, as said closing edge approaches closed position and following contact between said stop and said inner member, from an extended hanging position to a retracted position, said cable leading from junction means carried by said gate through the top of said inner telescoping member and lengthwise therein to said scanner housing, said housing being fastened to said inner telescoping member, said inner telescoping member including an upper extension adapted to extend lengthwise above the outer telescoping member when said inner telescoping member is in said retracted position relative to said gate, and to follow down into said outer telescoping member as said inner telescoping member shifts to said hanging position relative to said gate, said cable leading through the top of said extension and thence lengthwise therein and in said inner telescoping member proper to said scanner housing, whereby during shifting of said inner telescoping member between retracted and hanging positions, said cable is stabilized and is isolated from contact with said outer telescoping member, and is guided and protected against chafing and scuffing.

2. A device as in claim 1, said upper extension comprising a tubular member extending through the top of said outer telescoping member, said cable passing into the top of said tubular member and being surrounded thereby along the length of said tubular member.

3. A device as in claim 2, a nut threaded on the upper end of said tubular member, said nut engaging the top of said outer telescoping member to act as a stop as said inner telescoping member reaches its fully extended hanging position relative to said car door.

4. In an automatic power-operated gate for an elevator car having a car floor and vertical flanged side rails on which the gate is guided, said gate having means adjacent opposite ends of the closing edge of the gate for establishing a scanning beam parallel to and ahead of the closing edge of the gate at a predetermined distance sufficient to sense an interfering object in the path of the gate by interruption of the beam during closing motion of the gate and thereby provide a signal to cause the power operator of the gate to stop or reverse the motion of the gate before it strikes the interfering object, at least one end of said closing edge of said gate having, as its associated part of said beam-establishing means, at least one beam-establishing element proper comprising a beam projector or a beam receiver, and a scanner housing to carry and house said beam-establishing element proper together with cable terminal and connector means, an electrical cable leading from said car gate to said cable terminal and connector means, said at least one end of said gate also having associated with it lost-motion linkage means, one part of said linkage means being associated with said scanner housing, whereby as said closing edge approaches closed position, said one part of said linkage associated with said scanner housing may engage a stop associated with said car floor, and said one part and said scanner housing may cease movement in the closing direction and thereby, while said gate completes movement to closed position, retract from a hanging position relative to said gate to a fully retracted position relative to said gate, the improvement wherein said lost-motion linkage means includes inner and outer telescoping members extending vertically adjacent the associated one of said vertical side rails on which the gate is guided, said outer telescoping member being mounted on and for movement with said gate, said inner telescoping member comprising said part of said linkage means associated with said scanner housing, said inner member telescoping within said outer member, as said closing edge approaches closed position and following contact between said stop and said inner member, from an extended hanging position to a retracted position, said cable leading from junction means carried by said gate through the top of said inner telescoping member and lengthwise therein to said scanner housing, said housing being fastened within said inner telescoping member by fasteners accessible only from a direction covered by a flange of said adjacent associated vertical flanged side rail whereby said fasteners cannot be accessed and said housing removed without first disconnecting said outer telescoping member from its mounting on said gate and bodily removing said lost-motion linkage from said elevator.

5. A device as in claim 4, said gate being guided on said vertical side rails in closely spaced relation therewith, and said outer telescoping member being fastened to said gate through a mounting member welded to said outer telescoping member and fastened to the gate by screws which face the associated one of said closely spaced vertical side rails, whereby said lost-motion cannot be bodily removed from said gate by driving said screws with a conventional screwdriver or like tool.

6. A device as in claim 4, said inner telescoping member including an upper extension adapted to extend lengthwise above the outer telescoping member when said inner telescoping member is in said retracted position relative to said gate, and to follow down into said outer telescoping member as said inner telescoping member shifts to said hanging position relative to said gate, said cable leading through the top of said extension and thence lengthwise therein and in said inner telescoping member to said scanner housing, whereby during shifting of said inner telescoping member between retracted and hanging positions, said cable is stabilized and is isolated from contact with said outer telescoping member, and is guided and protected against chafing and scuffing.

* * * * *